United States Patent [19]

Lu et al.

[11] 4,188,449

[45] Feb. 12, 1980

[54] PHOSPHORESCENT SCREENS

[75] Inventors: Chen-i Lu, Rochester; Harry J. Krall, Webster; Herman R. Osmers, Pittsford, all of N.Y.

[73] Assignee: Eastman Kodak Company, Rochester, N.Y.

[21] Appl. No.: 821,875

[22] Filed: Aug. 4, 1977

[51] Int. Cl.$^2$ ............................ B05B 5/00; D06L 3/12
[52] U.S. Cl. ...................................... 428/314; 427/35; 427/54.1; 427/157; 427/243; 427/373; 428/329; 428/338; 428/341; 428/342; 428/413; 428/458; 428/917
[58] Field of Search .................. 427/54, 35, 157, 243, 427/373; 428/314, 413, 338, 458, 342, 341, 917

[56] References Cited

U.S. PATENT DOCUMENTS 3,776,754  12/1973  Levinos ............................... 96/36.1

*Primary Examiner*—Bernard D. Pianalto
*Attorney, Agent, or Firm*—A. P. Lorenzo

[57] ABSTRACT

Phosphorescent screens which are useful for such purposes as intensifying screens for radiographs are comprised of a support on which is coated a layer of finely-divided particles of a phosphor dispersed in a polymeric binder which has been cured by radiation. The phosphor layer includes voids formed by evaporation of a component which is present in the coating composition from which such layer is formed. Curing of the binder is carried out by use of suitable radiation, such as ultraviolet light or high energy ionizing radiation, and evaporation of the void forming component is carried out simultaneously with or subsequent to the radiation-curing of the binder.

35 Claims, No Drawings

PHOSPHORESCENT SCREENS

BACKGROUND OF THE INVENTION

1. Field of the Invention

This invention relates in general to phosphorescent screens and in particular to phosphorescent screens which are useful for such purposes as intensifying screens for radiographs. More specifically, this invention relates to phosphorescent screens which comprise a layer of finely-divided phosphor particles dispersed in a polymeric binder, to a process for production of such screens in which radiation-curing of the binder is utilized, and to a coating composition for use in the manufacture of the aforesaid screens.

2. Description of the Prior Art

It is well known to prepare phosphorescent screens by coating a support with a composition comprising phosphor particles, a polymeric binder and a solvent and drying the coating to remove the solvent and leave an adherent layer comprised of phosphor particles dispersed in the binder. A wide variety of polymeric materials have been disclosed in the prior art for use as a binding agent for the phosphor particles. Among such materials are the polyvinyl butyral of U.S. Pat. No. 3,043,710, the nylon resins of U.S. Pat. No. 3,300,310, the acrylic acid/alkyl acrylate copolymers of U.S. Pat. No. 3,300,311, the polycarbonates of U.S. Pat. Nos. 3,617,285 and 3,712,827, and the polyurethane elastomers of U.S. Pat. No. 3,743,833. Typically, the process of forming the screen involves the use of an organic solvent to form a dispersion of phosphor in binder and employs a drying step in which the solvent is removed by evaporation either at room temperature or at an elevated temperature. However, aqueous systems can also be used as in the case of the water-soluble copolymers of U.S. Pat. No. 3,300,311 and in U.S. Pat. No. 3,776,754 which describes a process for manufacture of screens for color television tubes in which corpuscular radiation is employed to cure selected areas of a radiation-curable layer formed by coating an aqueous composition containing binder and phosphor.

Prior methods of forming phosphorescent screens which comprise a layer of phosphor particles dispersed in a polymeric binder suffer from serious disadvantages which significantly restrict the usefulness of the resulting materials. For example, the phosphor layer may not adhere well to the support, or while having adequate adhesive strength it may lack the necessary cohesive strength. Due to the brittle character of some binders, the screen may not possess adequate flexibility and resistance to cracking and crazing. The radiographic speed of the screen may be unduly low due to the adverse effects of the binder, or the binder may not be able to accept sufficiently high loadings of phosphor particles. Because of inadequate durability of the phosphor layer or insufficient resistance to soiling, it may be essential to have a protective overcoat layer and because of the poor flatness characteristics of the screen it may be essential to have an anti-curl layer. Such additional layers add substantially to the cost of the product and greatly complicate the manufacturing process. Still other problems associated with prior art phosphorescent screens are inadequate dimensional stability, discoloration upon aging, and excessive change in properties with changes in temperature and/or humidity. Moreover, many of the prior art phosphorescent screens require manufacturing processes which are unduly slow or difficult to carry out and some require the use of toxic and hazardous solvents which must be evaporated in substantial quantities.

It is toward the objective of providing phosphorescent screens which overcome many of the disadvantages of prior art screens referred to above, which do not require protective overcoats or curl control layers, and which are manufactured by a simple, inexpensive and easily controlled process which can be carried out at high coating speeds, that the present invention is directed.

SUMMARY OF THE INVENTION

In accordance with this invention, phosphorescent screens are comprised of a support and a layer of finely-divided particles of a phosphor dispersed in a cross-linked void-containing polymeric matrix which has been formed by coating the support with a coating composition comprised of phosphor particles in a radiation-curable binder system, irradiating the coating to cure the binder, and forming voids in the resulting polymeric matrix by evaporating a component from the binder system either simultaneously with or subsequent to the radiation curing. To form the phosphor layer, the support is coated with a suspension of the phosphor particles in a viscous liquid composition which comprises a first component, either a monomer, oligomer or polymer or mixtures thereof, that is capable of being radiation-cured to form a cross-linked polymeric matrix surrounding the phosphor particles, and a second component that is capable of being evaporated to generate voids within the matrix, and the coating is irradiated with suitable radiation, such as for example ultraviolet radiation or high energy ionizing radiation. Evaporation of such second component to generate the voids can take place during the radiation curing, or during a subsequent drying step at room temperature or at an elevated temperature, or partially during curing and partially during a subsequent drying step.

Phosphorescent screens produced by the method described herein are highly resistant to delamination, cracking or crazing in view of the excellent adhesive and cohesive strength of the phosphor layer. They have excellent dimensional stability, are resistant to the effects of temperature and humidity change and resistant to discoloration on aging. They are durable and abrasion resistant to such an extent that a protective overcoat layer is not needed, and they have excellent flatness characteristics which render unnecessary the inclusion of a curl control layer. At the same time, they possess high radiographic speed and are capable of providing excellent contrast and image sharpness. They are easily prepared by a relatively simple, inexpensive process which can be carried out in a very short period of time and which avoids the need to utilize hazardous and toxic solvents.

DESCRIPTION OF THE PREFERRED EMBODIMENTS

The phosphorescent screens of this invention can be prepared from a wide variety of different materials, with the choice of materials used depending on the specific manufacturing techniques employed and the specific properties which are of greatest significance for the particular end use for which the screens have been designed. Methods of coating and irradiating to form the desired product are similarly capable of widespread variation. Control of the degree to which voids are formed in the phosphor-containing layer is easily achieved by selection of an appropriate amount of the evaporable component in the coating composition. This freedom of choice and the ability of the process to be successfully applied to a wide variety of starting materials are important advantageous features of the invention.

The support for the phosphorescent screens of this invention can be composed of any suitable material. For example it can be paper, baryta-coated paper, polymer-coated paper such as polyethylene-coated paper, a metal foil such as aluminum foil, or a foil-paper laminate. The support can also be a polymeric film such as a film formed from cellulose acetate, cellulose propionate, cellulose acetate propionate, cellulose acetate butyrate, polyethylene, polystyrene, poly(vinyl chloride), polymethyl methacrylate, vinyl chloride-acetate copolymer, polypropylene, poly(vinyl acetals), polycarbonates, polysulfones, polyethersulfones, polyimides, polyamides, or polyesters. Films formed from polyethylene terephthalate are especially useful. The thickness of the support will typically be in the range from about 4 to about 15 mils and preferably in the range from about 5 to about 7 mils.

The phosphors that are useful in forming the phosphorescent screens of this invention are well known materials. Typical examples of such phosphors include calcium tungstate, barium lead sulfate, zinc cadmium sulfide, lead-activated barium silicate, lead-activated strontium sulfate, gadolinium-activated yttrium oxide, europium-activated barium strontium sulfate, europium-activated barium lead sulfate, europium-activated yttrium vanadate, europium-activated yttrium oxide, europium-activated barium phosphate, terbium-activated gadolinium oxysulfide, terbium-activated lanthanum oxysulfide, magnesium gallate, and the like. Mixtures of two or more of the aforesaid phosphors can be employed, if desired. The phosphor is utilized in finely-divided particulate form. A preferred average particle size for the phosphor is in the range from about 1 to 100 microns and most preferably in the range from about 6 to about 18 microns.

To form the phosphorescent screen, the support is coated with a suspension of the finely-divided phosphor particles in a viscous liquid composition, as hereinafter described. The coating composition should be of a viscosity suitable to maintain the phosphor particles in suspension and yet permit easy coating at high coating speeds of a layer of uniform thickness. Optimum viscosity will, of course, be dependent upon numerous factors such as the particular method of coating and the size and density of the phosphor particles but will typically be in the range from about 500 to about 3000 centipoises at room temperature and more usually in the range from about 5000 to about 15000 centipoises. The phosphor layer can vary in wet thickness from about 2 mils or less up to about 25 mils or more and will most usually be in the range from about 3 to about 12 mils. In manufacturing screens by the method of this invention, the dry thickness of the phosphor layer will not usually be significantly different than the wet thickness after coating since the radiation curing forms the entire binder into a polymeric matrix and the only component removed from the coating is the void-generating component.

Coating of the support with the suspension of finely-divided phosphor particles in a viscous liquid composition can be carried out in any suitable manner. For example, it can be carried out by air-knife coating, roll coating, gravure coating, extrusion coating, bead coating, curtain coating, use of wire wound coating rods, and so forth.

The radiation-curable binder used in forming the phosphorescent screens of this invention can be selected from a very broad class of materials which are curable by radiation to yield a solid cross-linked polymeric matrix. Useful materials of this type can be monomers, oligomers or polymers, or mixtures thereof. While any radiation-curable material which can be successfully admixed with the phosphor particles and the void-generating component and coated on the support can be used, compositions comprising an unsaturated polymer dissolved in a polymerizable monomer are particularly advantageous. It is believed that in these compositions the monomer copolymerizes with the unsaturated polymer to form a cross-linked network. A wide variety of such radiation-curable compositions are known. For example, classes of polymers which are useful for this purpose include epoxy diacrylates, unsaturated polyesters, unsaturated acrylics, unsaturated polybutadienes, unsaturated acrylic modified polyurethanes, unsaturated acrylic modified polythioethers, acrylated glycols and polyols, unsaturated acrylic-terminated polybutadienes and polybutadiene/acrylonitriles, and the like. Specific examples of useful polymers are an epichlorohydrin/bisphenol-A epoxy that is reacted with acrylic acid or methacrylic acid to form acrylate or methacrylate ester end groups at both ends of the epoxy chain, as well as similar polymers prepared from novolac epoxies (fusible and soluble epoxy resins formed by condensation of a phenol with an aldehyde under acid conditions). Further examples of useful polymers are a bisphenol-A/fumaric acid polyester and a di(hydroxypropyl acrylate-anhydride) modified bisphenol-A/epichlorohydrin epoxy. Oligomers can be used in the radiation-curable composition in place of or in addition to the aforesaid polymers, for example, a polyoxyethylene diacrylate oligomer.

Further examples of polymeric materials useful in radiation-curable compositions which are suitably employed in the method of this invention are described in numerous patents, for example in U.S. Pat. Nos. 3,367,992; 3,551,235; 3,554,886; and 3,558,387.

Particularly preferred radiation-curable compositions for the purpose of forming the phosphorescent screens of this invention are compositions comprising an acrylated epoxy resin. The acrylated epoxy resins are well known materials and resins of this type have been described in numerous patents, for example in U.S. Pat. Nos. 3,661,576; 3,673,140; 3,713,864; and 3,772,062 and in British Pat. No. 1,375,177. Typical resins of this type are those derived from bisphenols. In a preferred embodiment of this invention, the acrylated epoxy resin is a reaction product of epichlorohydrin, bisphenol-A and an acrylic monomer, such reaction product being represented by the formula:

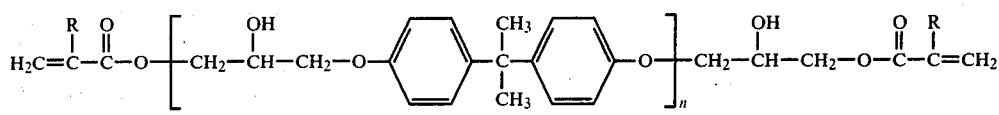

wherein R is a hydrogen atom or a methyl group and n is 1 to 20. These reaction products are relatively viscous liquids when n is low, e.g., 1 to 3, which become increasingly viscous as the value of n increases and are solids when n is high, e.g., 10 to 20.

When the acrylated epoxy resin is a liquid of a viscosity suitable for coating it can be used as the radiation-curable material that forms the binder for the phosphor particles without the addition thereto of any polymerizable monomer. When the acrylated epoxy resin is a solid it can be dissolved in a monofunctional acrylic monomer to form a composition suitable for coating. Such monomers can, of course, also be used to dilute the resin and render it less viscous when it is a liquid of too great a viscosity to be easily coated. Typical examples of monofunctional acrylic monomers useful for these purposes are acrylic and methacrylic esters such as ethyl acrylate, butyl acrylate, 2-hydroxypropyl acrylate, cyclohexyl acrylate, 2-ethylhexyl acrylate, methyl methacrylate, ethyl methacrylate, and the like. Polyfunctional acrylates and methacrylates, i.e., those containing at least two acrylic ester groups, can also be advantageously included in the radiation-curable composition to modify such characteristics as curing rate and brittleness of the cured layer. Typical examples of suitable polyfunctional acrylates and methacrylates are neopentylglycol diacrylate, trimethylol propane triacrylate, 1,6-hexanediol diacrylate, 1,3-propanediol dimethacrylate, 1,3-butylene glycol dimethacrylate, and the like. The radiation-curable composition can also contain other ethylenically unsaturated monomers such as styrene, ethyl vinyl benzene, α-methyl styrene, vinyl acetate, and the like. Mixtures of two or more monofunctional acrylates, of two or more polyfunctional acrylates, and of two or more other ethylenically unsaturated monomers can also be used as desired.

In addition to an acrylated epoxy resin, the radiation-curable composition used to form the polymeric matrix can also contain other resins which serve to modify its properties in a desirable manner, for example it can contain resins which act to improve its adhesive characteristics. The use of such other resins is optional and dependent upon the desired characteristics of the product.

A further example of a preferred class of radiation-curable materials for the purpose of forming the polymeric matrix of this invention are compositions comprising an acrylated urethane. The acrylated urethanes are well known and commonly used in radiation-curable coatings. Materials of this type are described, for example, in U.S. Pat. Nos. 3,509,234; 3,600,539; 3,694,415; 3,719,638 and 3,775,377 and in British Pat. No. 1,321,372. The acrylated urethane resins can be used by themselves or in combination with a different class of resins such as the acrylated epoxy resins.

It is a particularly important feature of this invention that the viscous liquid composition in which the phosphor particles are suspended contain a void-generating agent, for example a solvent which is readily evaporable. This agent must, of course, be a material which is not cured by radiation and which can be evaporated to generate voids within the polymeric matrix. It must also be a material which does not adversely affect the radiation-curable binder material(s), such as by chemically reacting therewith, or which renders the composition incapable of being coated or incapable of adhering to the support. Since the void-generating agent must not enter into the curing reaction to thereby become part of the matrix, it should not be a radiation-polymerizable material, for example, it should be free of ethylenic unsaturation. Preferably the void-generating agent should be relatively volatile in order to facilitate the generation of voids. The void-generating agent can, in addition to forming the voids, also serve to solubilize one or more of the components which form the polymeric matrix. Within these parameters, the void-generating agent can be selected from a wide variety of suitable materials. Typical examples of classes of materials which are useful as the void-generating agent in the process of this invention include ketones such as acetone or methyl ethyl ketone, hydrocarbons such as benzene or toluene, ethers such as tetrahydrofuran, alcohols such as methanol or isopropanol, halogenated alkanes such as ethylene dichloride or propylene dichloride, esters such as ethyl acetate or butyl acetate, and the like. Combinations of two or more of these organic solvents can, of course, be utilized as the void-generating agent if desired. Preferably, the void generating agent is an organic liquid having a normal boiling point in the range from about 40° C. to about 85° C. As an alternative to the use of a liquid material as the void-generating agent, there can be used, if desired, a solid which sublimes or decomposes on heating. Such solid materials should be utilized in very finely-divided form. Examples of solid materials which will sublime and thereby bring about the desired generation of voids include camphor, solid carbon dioxide, pyrogallol, salicylic acid, resorcinol, phenol, and the like. Examples of solid materials which will undergo heat decomposition and thereby bring about the desired generation of the voids include p-hydroxybenzoic acid, trihydroxybenzoic acid, sodium bicarbonate, azobisisobutyronitrile, benzene sulfonyl hydrazide, and the like.

As used herein, the term "voids" is intended to refer to microscopic-sized gas bubbles. When reference is made herein to a component capable of being evaporated to generate voids it is, as indicated above, intended to include within the term "evaporated" the processes of sublimation or decomposition of a solid void-generating agent.

The coating composition used in the manufacture of the phosphorescent screens of this invention can be an organic composition, or an aqueous composition, or a mixed aqueous-organic composition. The two essential components, in addition to the phosphor, are the component which is radiation-curable to form the solid cross-linked polymeric matrix and the void-generating component. In an aqueous system, the phosphor would be dispersed in an aqueous liquid containing a water-soluble or dispersible radiation-curable monomer, oligomer or polymer which would form the matrix and the voids would be generated by evaporation of the water.

The component which forms the matrix could be dissolved in the water or the composition could be a suspension or emulsion. Poly (ethylene glycol) diacrylates are typical examples of water-soluble or water-dispersible materials capable of being cured by radiation to form a solid matrix. A wide variety of other radiation-curable materials that can be dissolved, dispersed or emulsified in water are described in the prior art, for example in U.S. Pat. No. 3,892,575. In an organic system, the monomer, oligomer or polymer which forms the matrix is dissolved or dispersed in an organic void-generating liquid. Auxiliary organic liquids can be used to facilitate dissolution and/or dispersion of the component which forms the polymeric matrix and these can be liquids which are radiation-curable and become part of the matrix or liquids which are not radiation-curable and are evaporated from the coated layer. In mixed aqueous-organic systems the voids can be generated solely by evaporation of the water or by evaporation of both water and one or more organic liquids.

As indicated above, the essential components of the coating composition are, in addition to the phosphor, a component that is radiation-curable to form the solid cross-linked polymeric matrix and a void-generating agent. Other ingredients can optionally be included. For example, the coating composition can contain viscosity regulating agents such as silica and surfactants which facilitate the formation of the phosphor dispersion such as fluorocarbons, silicones, alkyl aryl polyether sulfates, phosphate esters, and the like.

A preferred coating composition for use in forming the phosphorescent screens of this invention is a dispersion of a phosphor in a liquid medium composed of an acrylic ester, an acrylated epoxy resin, and a ketone. A particularly preferred coating composition is a dispersion of a phosphor in a liquid medium composed of butyl acrylate, an acrylated epoxy resin of the formula given hereinabove in which n is in the range of 10 to 15, and methyl ethyl ketone.

Apparatus and methods for curing of radiation-curable compositions by subjecting them to suitable forms of radiation are well known and any suitable radiation curing process can be used in carrying out this invention. For example, curing can be carried out by the application of ultraviolet radiation of suitable intensity. High energy ionizing radiation such as X-rays, gamma rays, beta rays, and accelerated electrons can also be used to accomplish curing of the coating. Typically, the radiation used should be of a sufficient intensity to penetrate substantially all the way through the coated layer and will be applied uniformly to the entire surface of the coated layer. The total dosage employed should be sufficient to bring about curing of the radiation-curable composition to form a solid plastic. Typically, dosages in the range of about 0.2 to about 50 megarads, more usually in the range from about 0.5 to about 20 megarads, are employed. The radiation-curable components of the coating composition are completely convertible to a solid product so that only the void-generating agent is released from the coated layer.

When the radiation-curable composition is cured by the use of ultraviolet radiation, a photoinitiator should be included in the composition. Many photoinitiators which are useful for such purpose are known to the art, for example, butyl benzoin ether, isobutyl benzoin ether, ethyl benzoin ether, propyl benzoin ether, benzophenone, benzoin, acetophenone dimethyl quinoxiline, 4,4'-bis(dimethylamino)benzophenone, and the like. Such photoinitiators may be used singly or in combination. The use of photoinitiators is not necessary when curing is carried out with high energy electrons.

The specific curing conditions utilized should take into account the particular coating composition employed and the wet thickness of the coated layer. For ultraviolet light curing of coated layers of a thickness of up to about 15 mils, good results are typically obtained by advancing the coated material at a speed of about 45 feet per minute under a bank of high-intensity mercury vapor lamps having a watt density of 200 watts per linear inch or lamp and a spectral range of 240 to 1367 nanometers. When the thickness of the coating does not exceed about 30 mils, electron curing can be satisfactorily carried out by advancing the coated material at a rate of about 130 feet per minute through a 20 mA, 300 KV accelerator. When the thickness is greater than this, an electron accelerator of higher energy should be employed. Coatings of considerable thickness can be readily cured by the use of ultraviolet radiation since the presence of the phosphor promotes the curing, i.e., the phosphor particles absorb a portion of the ultraviolet radiation and re-emit radiation which promotes the curing reaction.

The evaporation of the void-generating agent can take place simultaneously with or subsequent to the curing step which forms the cross-linked polymeric matrix. Under conditions where the irradiation step generates sufficient heat, evaporation may be almost completed by the time the curing is finished so that both processes take place nearly simultaneously. This will ordinarily be the case where the void-generating agent is quite volatile and the radiation source is not controlled or shielded in some manner to avoid increases in temperature of the irradiated material by conduction and/or convection. For example, a typical high intensity ultraviolet lamp will generate substantial heat, as will irradiation in an electron accelerator. This heat will frequently be sufficient to complete evaporation of the void-generating agent during curing. Supplemental heating can be employed either during or subsequent to the radiation-curing step. Evaporation of the void-forming agent can be augmented by a subsequent drying step. Such drying can be carried out at room temperature for relatively long periods of time or at elevated temperatures for shorter periods of time, as desired.

In the curing step employed in the manufacture of the phosphorescent screens of this invention, irradiation of the wet coated layer first initiates polymerization and/or cross-linking at the surface with the result that there is a tendency for a crust to form. As the irradiation continues the polymerization and/or cross-linking proceeds deeper into the coated layer until eventually all of the binder is formed into a polymeric matrix. While the generation of the matrix is taking place, the void-generating agent gradually evaporates to form bubbles. The crust and the high viscosity of the coating composition inhibit escape, collapse or coalescence of the bubbles but the gas diffuses to the surface where it passes into the atmosphere. Such diffusion is promoted by heating. This eventually results in the generation of voids with essentially no residual void-generating agent remaining in the phosphor layer. Little or no collapse or shrinking of the coated layer takes place so that the dry fully-cured layer is substantially as thick as the wet layer. The percentage of voids is easily controlled to a desired level by the use of smaller or greater amounts of the void-generating agent in the coating composition.

The amount of void-generating agent employed can be varied widely. Typically, the percentage by weight of void-generating agent based on the total weight of the coating composition will be in the range from about 2 to about 35% and preferably in the range from about 5 to about 15%.

It is desirable that the phosphor layer be of relatively slight thickness, as a thick layer tends to result in lower radiographic speed and poorer image sharpness. At the same time it is desirable to provide a large quantity of phosphor per unit area of support in order to provide high radiographic speed. To meet these requirements it is necessary to provide a high ratio of phosphor to polymeric binder. Ratios of phosphor to binder of at least about 5 to 1 and more preferably at least about 10 to 1 on a weight basis are desirable and the method of this invention is amenable to use of such high phosphor to binder ratios. Phosphor coverage in the screen can vary widely, as desired, and is typically in the range from about 10 to about 100 grams/ft$^2$ and preferably in the range from about 30 to about 80 grams/ft$^2$.

Control of the degree to which voids are present in the polymeric matrix is an important feature of the present invention. If the percentage of void volume is too low the radiographic speed will be adversely affected. On the other hand, too high a percentage of void volume reduces the strength and durability of the phosphor layer and involves the evaporation of greater quantities of void-generating agent and, accordingly, additional energy requirements to provide the necessary heat. Preferably the phosphorescent screens of this invention comprise a phosphor layer with a percentage of void volume of about 1 percent to about 20 percent, by volume, more preferably from about 5 to about 15 percent, and most preferably about 10 percent.

The phosphorescent screens described herein are especially useful as intensifying screens for radiographs. They are useful in integral or non-integral combination with image-forming photographic materials, for example, they can be used in non-integral combinations in which the phosphor layer of the screen is held in contact with an image-forming layer of a separate photographic element, or in integral combination in a composite photographic element and intensifying screen combination comprised of a support, the phosphor layer, and an image-forming layer. Typically, the image-forming layer will be a gelatino/silver halide emulsion layer. The excellent flatness, smoothness and flexibility of the phosphor layer of the screens of this invention greatly facilitates the intimate and uniform contact between the surfaces of the screen and the photographic material that is desirable in non-integral combinations.

While not ordinarily necessary with the phosphorescent screens of this invention, protective overcoats and curl control layers can, of course, be used if desired. Also, if the support is one with which it is difficult to achieve adequate adhesion of the phosphor layer then a suitable subbing layer can be utilized as is well known in the art.

In a preferred embodiment of the invention, the radiographic speed of the phosphorescent screen is increased by using a reflective support rather than a transparent support. When a transparent support is used it transmits some phosphorescence, generated from the excited phosphor during the exposure to X-ray radiation, to the side opposite the photographic film where it produces no exposure of the photographic film and thereby lowers the radiographic speed. By using a reflective support instead of a transparent support, for example, barytacoated paper or bright silver coated polyester film, such as a film with a 300 mg/ft$^2$ coating of electrolytically deposited silver, the phosphorescence is re-directed toward the photographic film to increase its exposure.

The invention is further illustrated by the following examples of its practice.

In the examples which follow, reference to void content refers to measurement of the percentage voids by volume in the phosphor layer measured in the following manner:

A six inch square piece of the phosphorescent screen is weighed and its thickness is measured. Void volume is determined by subtracting the volume of the support, phosphor and binder, as determined using the known density and weight fraction of each, from the total volume of the screen. Percentage voids is calculated from the value obtained for void volume.

Reference to radiographic speed refers to speed measurement made in the following manner:

A film-screen combination which serves as a standard of comparison is formed by sandwiching a section of Kodak X-OMATIC G Film 4510 between a pair of Kodak X-OMATIC phosphor screens. A second film-screen combination is prepared by sandwiching a section of the same film between a pair of screens each of which has been prepared by the method of the present invention. Each combination is exposed to X-ray radiation at the same dose and dose rate and then the exposed film is processed at standard conditions and the neutral density is determined. The X-OMATIC screen is assigned a radiographic speed (SR) of 103. In evaluating the test screen, each incremental difference of ±0.035 in neutral density, as compared to the standard screen, is defined as an SR change of ±1.

EXAMPLE 1

A radiation-curable coating composition was prepared from the following ingredients:

| Component | Parts by Weight |
|---|---|
| Phosphor[1] | 13 |
| Acrylated epoxy resin[2] | 1.28 |
| Butyl acrylate | 1.0 |
| Methyl ethyl ketone | 0.73 |

| Component | Parts by Weight |
|---|---|
| Benzoin | 0.03 |

[1] The phosphor was finely-divided europium-activated barium strontium sulfate having a particle size of 4 to 10 microns.
[2] The acrylated epoxy resin was a condensation product of epichlorohydrin and bisphenol-A (molar ratio of 1.6:1) reacted with methacrylic acid to form ester end groups and is represented by the formula:

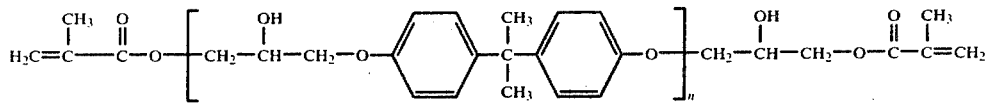

wherein n has a value of about 13.

The radiation-curable composition was coated as a layer with a wet thickness of 12.6 mils on a poly(ethylene terephthalate) film having a thickness of 7 mils. The coated film was then irradiated with UV light by passing it at a speed of 45 ft/min through a curing chamber containing three 200-watts-per-linear inch, Hanovia, medium pressure, mercury type. UV lamps with the coated layer facing the UV source. The total time in the curing chamber was 3 seconds. The benzoin was included in the coating composition as a photoinitiator and the methyl ethyl ketone as a void-generating agent. Both the acrylated epoxy resin and the butyl acrylate are radiation-curable materials and were cured by the UV light into a crosslinked polymeric matrix surrounding the phosphor particles. As a result of the heat generated in the curing chamber, the methyl ethyl ketone was evaporated from the coated layer during the curing to thereby form voids in the polymeric matrix. The screen emerged from the curing chamber with the coated layer in a dry state and strongly bonded to the support. The void content of the phosphor layer was 10.9%, the phosphor coverage was 68.7 gm/ft$^2$ and the radiographic speed was 110. In addition to having a high radiographic speed and providing excellent contrast and image sharpness, the screen was found to be highly resistant to delamination, cracking or crazing, extremely durable and abrasion resistant, flat, flexible, and possessed of excellent dimensional stability, resistance to discoloration, and resistance to change in properties with changes in temperature and/or humidity.

For purposes of comparison, a radiation-curable coating composition which contained no void-generating agent was prepared from the following ingredients:

| Component | Parts by Weight |
|---|---|
| Phosphor[1] | 13 |
| 2-hydroxypropyl acrylate | 2.42 |
| Surfactant[2] | 0.025 |
| Isobutyl benzoin ether | 0.06 |

[1] The phosphor was finely-divided europium-activated barium strontium sulfate having a particle size of 4 to 10 microns.
[2] The surfactant was a phosphate ester avilable under the trademark Triton QS-44 from Rohm and Haas Company.

The radiation-curable composition was coated as a layer with a wet thickness of 13 mils on a poly(ethylene terephtalate) film having a thickness of 7 mils and cured for 3 seconds by exposure to UV light in the same manner as described above. The void content of the phosphor layer was zero, the phosphor coverage was 68 gm/ft$^2$, and the radiographic speed was 75. This example is indicative of the fact that omitting the void-generating agent from the process described herein results in a screen with inferior speed characteristics.

For the purposes of further comparison, a coating composition which is not radiation-curable was prepared from the following ingredients:

| Component | Parts by Weight |
|---|---|
| Phosphor[1] | 11 |
| Polyurethane elastomer binder[2] | 1 |
| Tetrahydrofuran | 4.2 |

[1] The phosphor was finely divided europium-activated barium strontium sulfate having a particle size of 4 to 10 microns.
[2] The binder was the polyurethane elastomer described in Example 1 of U.S. Pat. No. 3,743,833.

The coating composition was coated in an amount sufficient to provide a dry thickness of 10 mils on a poly(ethylene terephthalate) film having a thickness of 7 mils and dried in an oven in which it was maintained at a temperature of about 100° F. for about 30 minutes followed by a temperature of about 175° F. for about 10 minutes. The void content of the phosphor layer was 31%, the phosphor coverage was 55 gm/ft$^2$, and the radiographic speed was 103. Screens prepared in this manner are inferior to those prepared by the method of the present invention in regard to such features as the adhesive and cohesive strength of the phosphor layer, resistance to soiling, durability and abrasion resistance. Moreover, the manufacturing process is much more time consuming and involves the use of large quantities of the hazardous solvent tetrahydrofuran.

EXAMPLE 2

A radiation-curable coating composition was prepared from the following ingredients:

| Component | Parts by Weight |
|---|---|
| Phosphor of Example 1 | 13 |
| Acrylated epoxy resin of Example 1 | 1.53 |
| Butyl acrylate | 1.20 |
| Methyl ethyl ketone | 0.27 |
| Benzoin | 0.03 |

The radiation-curable composition was coated as a layer with a wet thickness of 13 mils on a poly(ethylene terephthalate) film having a thickness of 7 mils and the coated film was irradiated with UV light under the same conditions as in Example 1. The screen produced in this manner had a void content of 4.6%, a phosphor coverage of 66.5 gm/ft$^2$ and a radiographic speed of 97. Comparison of this example with Example 1 indicates the effect of variation in void content on radiographic speed.

EXAMPLE 3

A radiation-curable coating composition was prepared from the following ingredients:

| Component | Parts by Weight |
| --- | --- |
| Phosphor of Example 1 | 13 |
| Acrylated epoxy resin of Example 1 | 1.46 |
| Butyl acrylate | 1.14 |
| Methyl ethyl ketone | 0.40 |
| Benzoin | 0.03 |

The radiation-curable composition was coated as a layer with a wet thickness of 9.2 mils on a poly(ethylene terephthalate) film having a thickness of 7 mils and the coated film was irradiated with UV light under the same conditions as in Example 1. The screen produced in this manner had a void content of 5.9%, a phosphor coverage of 51.4 gm/ft$^2$, and a radiographic speed of 95. Comparison of this example with Example 2 indicates that approximately the same radiographic speed can be obtained at significantly lower phosphor coverage by slightly increasing the void content.

EXAMPLE 4

A radiation-curable coating composition was prepared from the following ingredients:

| Component | Parts by Weight |
| --- | --- |
| Phosphor of Example 1 | 13 |
| Acrylated epoxy resin of Example 1 | 1.28 |
| Butyl acrylate | 1.0 |
| Methyl ethyl ketone | 0.73 |
| Benzoin | 0.03 |

The radiation-curable composition was coated as a layer with a wet thickness of 9.4 mils on a poly(ethylene terephthalate) film having a thickness of 7 mils and the coated film was irradiated with UV light under the same conditions as in Example 1. The screen produced in this manner had a void content of 10.8%, a phosphor coverage of 52 gm/ft$^2$, and a radiographic speed of 103. Comparison of this example with Example 3 indicates the effect of variation in void content on radiographic speed.

EXAMPLE 5

A radiation-curable coating composition was prepared from the following ingredients:

| Component | Parts by Weight |
| --- | --- |
| Phosphor of Example 1 | 13 |
| Acrylated epoxy resin of Example 1 | 1.53 |
| Butyl acrylate | 0.90 |
| Methyl ethyl ketone | 0.57 |
| Benzoin | 0.03 |

The radiation-curable composition was coated as a layer with a wet thickness of 13.5 mils on a baryta-coated paper having a thickness of 10 mils and the coated paper was irradiated with UV light under the same conditions as in Example 1. The screen produced in this manner had a void content of 7.8%, a phosphor coverage of 79.4 gm/ft$^2$ and a radiographic speed of 119. This example is indicative of the fact that substantial improvement in radiographic speed can be achieved by use of a reflective support.

EXAMPLE 6

A radiation-curable coating composition was prepared from the following ingredients:

| Component | Parts by Weight |
| --- | --- |
| Phosphor of Example 1 | 13 |
| Acrylated epoxy resin of Example 1 | 0.26 |
| Acrylated polyurethane resin[1] | 1.2 |
| 2-Ethylhexyl acrylate | 0.3 |
| Butyl acrylate | 1.2 |
| Methyl ethyl ketone | 0.045 |
| Benzoin | 0.03 |

[1]The acrylated polyurethane resin used in this formulation is available from the Cargill Corporation under the tradename Cargill 47 resin.

The radiation-curable composition was coated as a layer with a wet thickness of 10 mils on a poly(ethylene terephthalate) film having a thickness of 7 mils and the coated film was irradiated with UV light under the same conditions as in Example 1. The screen produced in this manner had a void content of 0.7%, a phosphor coverage of 52.3 gm/ft$^2$ and a radiographic speed of 92. This example illustrates the use of an acrylated polyurethane resin as a binder and is indicative of the tendency of low void volume to result in low radiographic speed.

EXAMPLE 7

A radiation-curable coating composition was prepared from the following ingredients:

| Component | Parts by Weight |
| --- | --- |
| Phosphor of Example 1 | 13 |
| Acrylated epoxy resin of Example 1 | 0.26 |
| Acrylated polyurethane resin of Example 6 | 0.96 |
| 2-Ethylhexyl acrylate | 0.24 |
| Butyl acrylate | 0.99 |
| Methyl ethyl ketone | 0.35 |
| Acetone | 0.21 |
| Benzoin | 0.03 |

The radiation-curable composition was coated as a layer with a wet thickness of 9.5 mils on a poly(ethylene terephthalate) film having a thickness of 7 mils and the coated film was irradiated with UV light under the same conditions as in Example 1. The screen produced in this manner had a void content of 7.3%, a phosphor coverage of 56.5 gm/ft$^2$ and a radiographic speed of 103. In a second sample prepared in the identical manner except that the wet thickness was 10.5 mils, the void content of the phosphor layer was 7.7%, the phosphor coverage was 60 gm/ft$^2$ and the radiographic speed was 106. In this example, the acrylated epoxy resin, the acrylated polyurethane resin, the 2-ethylhexyl acrylate and the butyl acrylate all enter into the curing reactions to form the cross-linked polymeric matrix surrounding the phosphor particles and both the methyl ethyl ketone and the acetone serve as void-generating agents. Comparison of this example with Example 6 demonstrates the effects of variation in void content and phosphor coverage on radiographic speed.

Phosphorescent screens prepared in accordance with this invention have many advantageous characteristics as hereinbefore described. The process for their manufacture described herein is also highly advantageous. Not the least among its advantageous features is the fact that it is suitable for use with a wide variety of different materials serving as the support, the phosphor, the binder and the void-generating agent. Important aspects of the process are that the liquid portion of the coating composition readily disperse the phosphor particles to form a dispersion which can be uniformly coated at high speed by practical techniques and that the dispersion include a first component that is cured by radiation to a solid matrix in which the phosphor particles are suspended and a second component which will generate voids within the phosphor layer. Within these parameters, the process can be widely varied in respect to particular materials and particular operating conditions.

The invention has been described in detail with particular reference to preferred embodiments thereof, but it will be understood that variations and modifications can be effected within the spirit and scope of the invention.

We claim:

1. A phosphorescent screen comprising a support and a layer of finely-divided particles of a phosphor dispersed in a cross-linked, void-containing polymeric matrix, said layer having been formed by:
   (1) coating said support with a radiation-curable composition comprising a suspension of said finely-divided phosphor particles in a viscous liquid composition, said viscous liquid composition comprising a first component that is capable of being radiation-cured to form a cross-linked polymeric matrix surrounding said phosphor particles and a second component that is capable of being evaporated to generate voids within said matrix,
   (2) irradiating said coating to cure said first component and form thereby a cross-linked polymeric matrix surrounding said phosphor particles, and
   (3) evaporating said second component simultaneously with or subsequent to said irradiating to thereby generate voids within said matrix.

2. A phosphorescent screen as claimed in claim 1 wherein the void content of said phosphor layer is in the range of from about 1 to about 20 percent by volume.

3. A phosphorescent screen as claimed in claim 1 wherein the void content of said phosphor layer is in the range from about 5 to about 15 percent by volume.

4. A phosphorescent screen as claimed in claim 1 wherein the void content of said phosphor layer is about 10 percent by volume.

5. A phosphorescent screen as claimed in claim 1 wherein the particle size of said phosphor particles is in the range from about 1 to about 100 microns.

6. A phosphorescent screen as claimed in claim 1 wherein said phosphor is europium-activated barium strontium sulfate.

7. A phosphorescent screen as claimed in claim 1 wherein said first component comprises an acrylated epoxy resin.

8. A phosphorescent screen as claimed in claim 1 wherein said first component comprises an acrylated epoxy resin which is a condensation product of epichlorohydrin, bisphenol-A and an acrylic monomer.

9. A phosphorescent screen as claimed in claim 1 wherein said first component comprises an acrylated epoxy resin of the formula:

$$H_2C=\underset{R}{\overset{}{C}}-\underset{}{\overset{O}{\overset{\|}{C}}}-O-\left[CH_2-\underset{OH}{\overset{}{C}H}-CH_2-O-\underset{}{\overset{}{\underset{}{\phantom{X}}}}\!\!\!\!\!\!\!\!\!\!-\underset{CH_3}{\overset{CH_3}{\overset{}{C}}}-\!\!\!\!\!\!\!\!\!\!\underset{}{\overset{}{\underset{}{\phantom{X}}}}-O\right]_n CH_2-\underset{OH}{\overset{}{C}H}-CH_2-O-\overset{O}{\overset{\|}{C}}-\underset{R}{\overset{}{C}}=CH_2$$

wherein R is a hydrogen atom or a methyl group and n is 1 to 20.

10. A phosphorescent screen as claimed in claim 1 wherein said first component comprises an acrylated epoxy resin of the formula:

$$H_2C=\underset{CH_3}{\overset{}{C}}-\underset{}{\overset{O}{\overset{\|}{C}}}-O-\left[CH_2-\underset{OH}{\overset{}{C}H}-CH_2-O-\underset{}{\overset{}{\underset{}{\phantom{X}}}}\!\!\!\!\!\!\!\!\!\!-\underset{CH_3}{\overset{CH_3}{\overset{}{C}}}-\!\!\!\!\!\!\!\!\!\!\underset{}{\overset{}{\underset{}{\phantom{X}}}}-O\right]_n CH_2-\underset{OH}{\overset{}{C}H}-CH_2-O-\overset{O}{\overset{\|}{C}}-\underset{CH_3}{\overset{}{C}}=CH_2$$

wherein n has a value of about 13.

11. A phosphorescent screen as claimed in claim 1 wherein said first component comprises an acrylated epoxy resin and an acrylic monomer.

12. A phosphorescent screen as claimed in claim 1 wherein said first component comprises an acrylated epoxy resin, an acrylated urethane resin and an acrylic monomer.

13. A phosphorescent screen as claimed in claim 1 wherein said second component is an organic liquid having a normal boiling point in the range from about 40° C. to about 85° C.

14. A phosphorescent screen as claimed in claim 1 wherein said second component is a ketone.

15. A phosphorescent screen as claimed in claim 1 wherein said second component is methyl ethyl ketone.

16. A phosphorescent screen as claimed in claim 1 wherein said viscous liquid composition comprises an acrylated epoxy resin, an acrylic ester and a ketone.

17. A phosphorescent screen as claimed in claim 1 wherein said viscous liquid composition comprises butyl acrylate, methyl ethyl ketone, and an acrylated epoxy resin of the formula:

$$H_2C=\underset{CH_3}{\overset{}{C}}-\underset{}{\overset{O}{\overset{\|}{C}}}-O-\left[CH_2-\underset{OH}{\overset{}{C}H}-CH_2-O-\underset{}{\overset{}{\underset{}{\phantom{X}}}}\!\!\!\!\!\!\!\!\!\!-\underset{CH_3}{\overset{CH_3}{\overset{}{C}}}-\!\!\!\!\!\!\!\!\!\!\underset{}{\overset{}{\underset{}{\phantom{X}}}}-O\right]_n CH_2-\underset{OH}{\overset{}{C}H}-CH_2-O-\overset{O}{\overset{\|}{C}}-\underset{CH_3}{\overset{}{C}}=CH_2$$

wherein n has a value of about 13.

18. A phosphorescent screen as claimed in claim 1 wherein said support is a polyester film.

19. A phosphorescent screen as claimed in claim 1 wherein said support is a poly(ethylene terephthalate) film.

20. A phosphorescent screen as claimed in claim 1 wherein said support is a silver coated polyester film.

21. A phosphorescent screen as claimed in claim 1 wherein said support is baryta-coated paper.

22. A phosphorescent screen as claimed in claim 1 wherein the phosphor coverage of said screen is in the range from about 10 to about 100 grams/ft$^2$.

23. A phosphorescent screen comprising a support and a layer of finely-divided particles of a phospor dispersed in a cross-linked void-containing polymeric matrix, said layer having been formed by:
(1) coating said support with a radiation-curable composition comprising a suspension of said finely-divided phosphor particles in a viscous liquid composition, said viscous liquid composition comprising a first component that is capable of being radiation-cured to form a cross-linked polymeric matrix surrounding said phosphor particles and a second component that is capable of being evaporated to generate voids within said matrix, said phosphor being europium-activated barium strontium sulfate, said first component comprising a solution of an acrylated epoxy resin in butyl acrylate, said second component being methyl ethyl ketone, and said viscous liquid composition additionally comprising a photoinitiator,
(2) irradiating said coating with ultraviolet light to cure said first component and form thereby a cross-linked polymeric matrix surrounding said phosphor particles, and
(3) evaporating said second component simultaneously with or subsequent to said irradiating to thereby generate voids within said matrix.

24. A method for the manufacture of a phosphorescent screen, said method comprising the steps of:
(1) coating a support with a radiation-curable composition comprising a suspension of finely-divided phosphor particles in a viscous liquid composition, said viscous liquid composition comprising a first component that is capable of being radiation-cured to form a cross-linked polymeric matrix surrounding said phosphor particles and a second component that is capable of being evaporated to generate voids within said matrix,
(2) irradiating said coating to cure said first component and form thereby a cross-linked polymeric matrix surrounding said phosphor particles, and
(3) evaporating said second component simultaneously with or subsequent to said irradiating to thereby generate voids within said matrix.

25. A method as claimed in claim 24 wherein said first component comprises an acrylated epoxy resin.

26. A method as claimed in claim 24 wherein said second component is an organic liquid having a normal boiling point in the range from about 40° C. to about 85° C.

27. A method as claimed in claim 24 wherein said second component is present in said viscous liquid composition in an amount sufficient to provide a void content in said phosphor layer in the range of from about 5 to about 15 percent by volume.

28. A method as claimed in claim 24 wherein said first component comprises an acrylated epoxy resin and an acrylic monomer and said second component is a ketone.

29. A method as claimed in claim 24 wherein said second component is a ketone and said first component comprises an acrylic monomer and an acrylated epoxy resin of the formula:

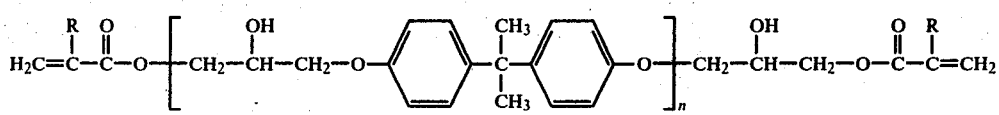

wherein R is a hydrogen atom or a methyl group and n is 1 to 20.

30. A method as claimed in claim 24 wherein said phosphor is europium-activated barium strontium sulfate, said second component is methyl ethyl ketone and said first component comprises butyl acrylate and an acrylated epoxy resin of the formula:

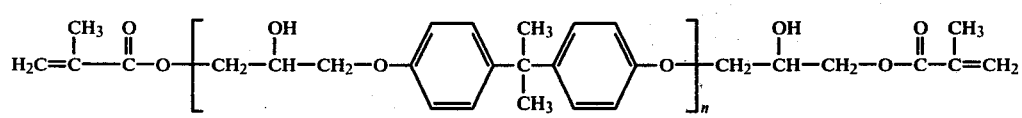

wherein n has a value of about 13.

31. A method as claimed in claim 24 wherein said support is a polyester film.

32. A method as claimed in claim 24 wherein said support is a poly(ethylene terephthalate) film.

33. A method as claimed in claim 24 wherein said viscous liquid composition additionally comprises a photoinitiator.

34. A method as claimed in claim 24 wherein said coating is cured by exposure to ultraviolet radiation.

35. A method as claimed in claim 24 wherein said coating is cured by exposure to accelerated electrons.

* * * * *